United States Patent [19]

Pelto

[11] 4,406,121

[45] Sep. 27, 1983

[54] ROTARY FLUID DEVICE

[76] Inventor: John H. Pelto, 292 Jones St., Mt. Clemens, Mich. 48043

[21] Appl. No.: 67,728

[22] Filed: Aug. 20, 1979

[51] Int. Cl.³ ............................................. F16H 41/04
[52] U.S. Cl. ...................................... 60/330; 74/572; 60/363; 415/80; 415/81; 415/82; 415/199.6
[58] Field of Search ................... 74/572; 415/80, 81, 415/82, 143, 199.6; 60/330, 340, 363

[56] References Cited

U.S. PATENT DOCUMENTS

| | | | |
|---|---|---|---|
| 921,118 | 5/1909 | Kasley | 415/147 |
| 2,404,515 | 7/1946 | Meyer | 74/572 |
| 2,673,450 | 3/1954 | Wolf | 60/363 |
| 2,720,952 | 10/1955 | Alexanrescu | 60/363 |
| 3,360,924 | 1/1968 | Davis | 74/572 X |
| 4,120,603 | 10/1978 | Downing | 415/143 X |

*Primary Examiner*—G. L. Walton
*Attorney, Agent, or Firm*—Gregory J. Nelson

[57] ABSTRACT

A multiple stage energized fluid flywheel is contained within a housing. An axially extending shaft is rotatably mounted within the housing. Fluid is introduced into the unit through an initial axial flow section and further pressure increases are experienced in a radial blower section and an annular squirrel cage section peripherally arranged about the radial blower. Pressurized fluid discharged from the squirrel cages is directed to either a peripheral exhaust ring which discharges pressurized fluid to the reservoir interior or to an adjacent hydraulic motor. The hydraulic motor includes a rotor which is secured to the stator section of the initial axial pumping section. The axial shaft, radial blower, squirrel cage and exhaust section rotate as a unit in one direction of operation. The hydraulic motor and axial pumping section stator rotate as a unit in the opposite direction of rotation. The flywheel may operate using air, hydraulic fluid or other motive fluids. Several flywheel units may be mounted in a balanced arrangement on a single shaft within an enclosure.

5 Claims, 14 Drawing Figures

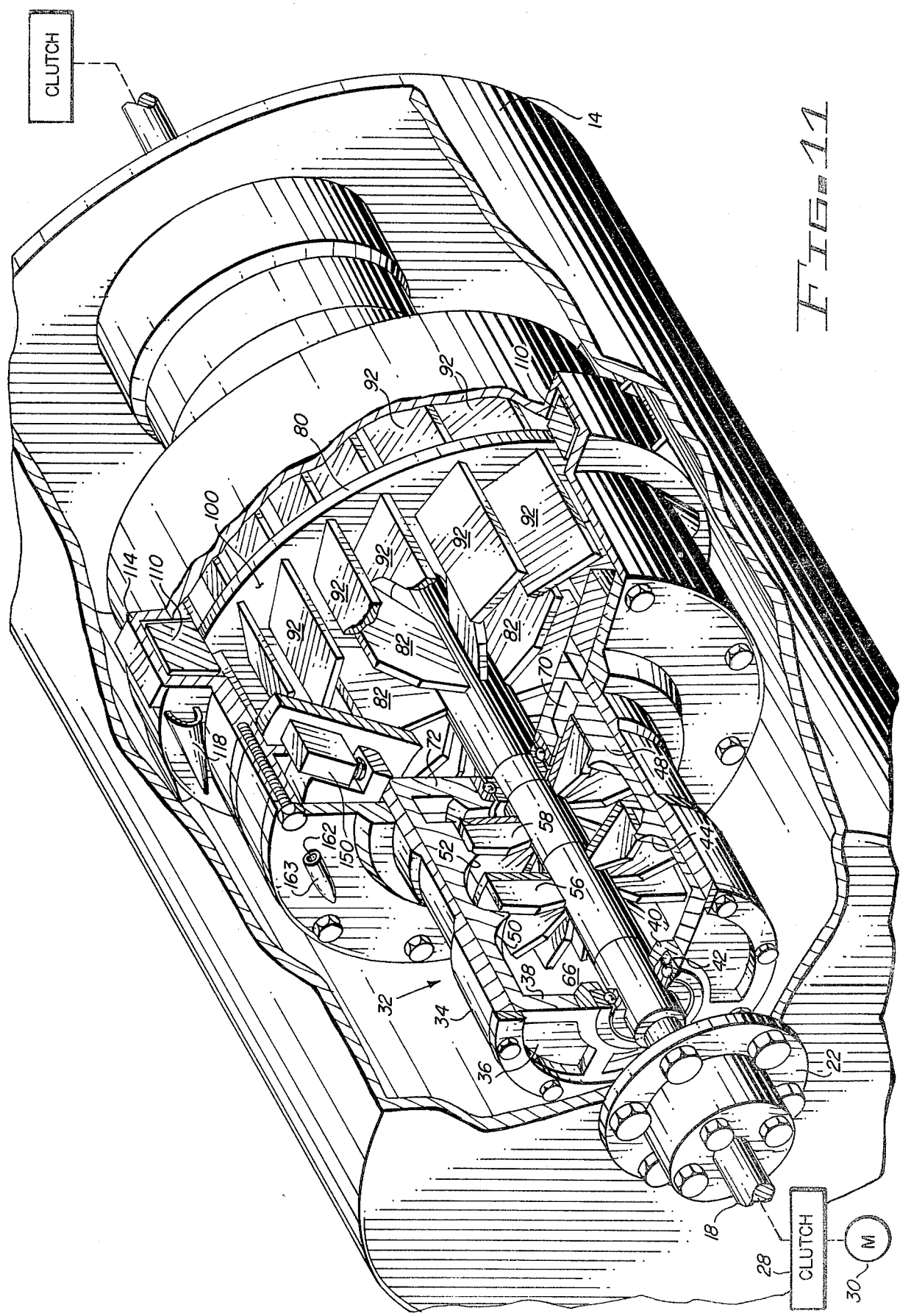

ROTARY FLUID DEVICE

The present invention relates to a rotary fluid device and more particularly relates to a multistage fluid motor or pump which may be operated as a flywheel.

Flywheels generally consist of circular wheels or rims used in mechanical apparatus which, due to their inertia, moderate fluctuations of speed and torque at the output of a driven device. Rotary fluid devices generally have not performed well as flywheels in that these devices increase the static pressure drag on the driving source thus reducing the power output obtainable from the device. The present invention provides an improved rotary fluid motor or pump operable as a flywheel which reduces the static pressure drag on the driving source and which can be connected to any type of driving source such as a wind device, an electric motor, a gas engine, a steam or water driven apparatus. The device of the present invention incorporates multiple pressure stages in sequence in a closed system.

Briefly, the present invention consists of a rotary fluid device enclosed within a housing, which defines a closed reservoir. An axially extending shaft is mounted in bearings in the housing. The axial shaft is adapted to be connected to a prime mover energy source at an appropriate clutch or coupling device. Similarly, the output end of the axial shaft can be connected to some driven device at a clutch or coupling to perform useful work. Fluid such as air or hydraulic fluid is pumped from the reservoir through the device. The fluid is pumped through an initial multiple stage axial section to a second stage radial section. The discharge from the radial section is directed to a third stage centrifugal section. To further increase the pressure of the pumped fluid, discharge from the annular centrifugal section is directed to an annular exhaust ring which discharges the fluid to the reservoir or to a concentric vane fluid motor across a regulating valve. The fluid motor serves to rotate the housing of the initial axial pump section in a direction opposite the direction of rotation of the first stage axial second stage, radial third stage centrifugal and exhaust components of the unit.

The above and other objects of the present invention will be more fully appreciated from the following description, claims and drawings in which:

FIG. 11 is a perspective view, partly broken away, illustrating the details of the rotary device of the present invention.

Figure 1:
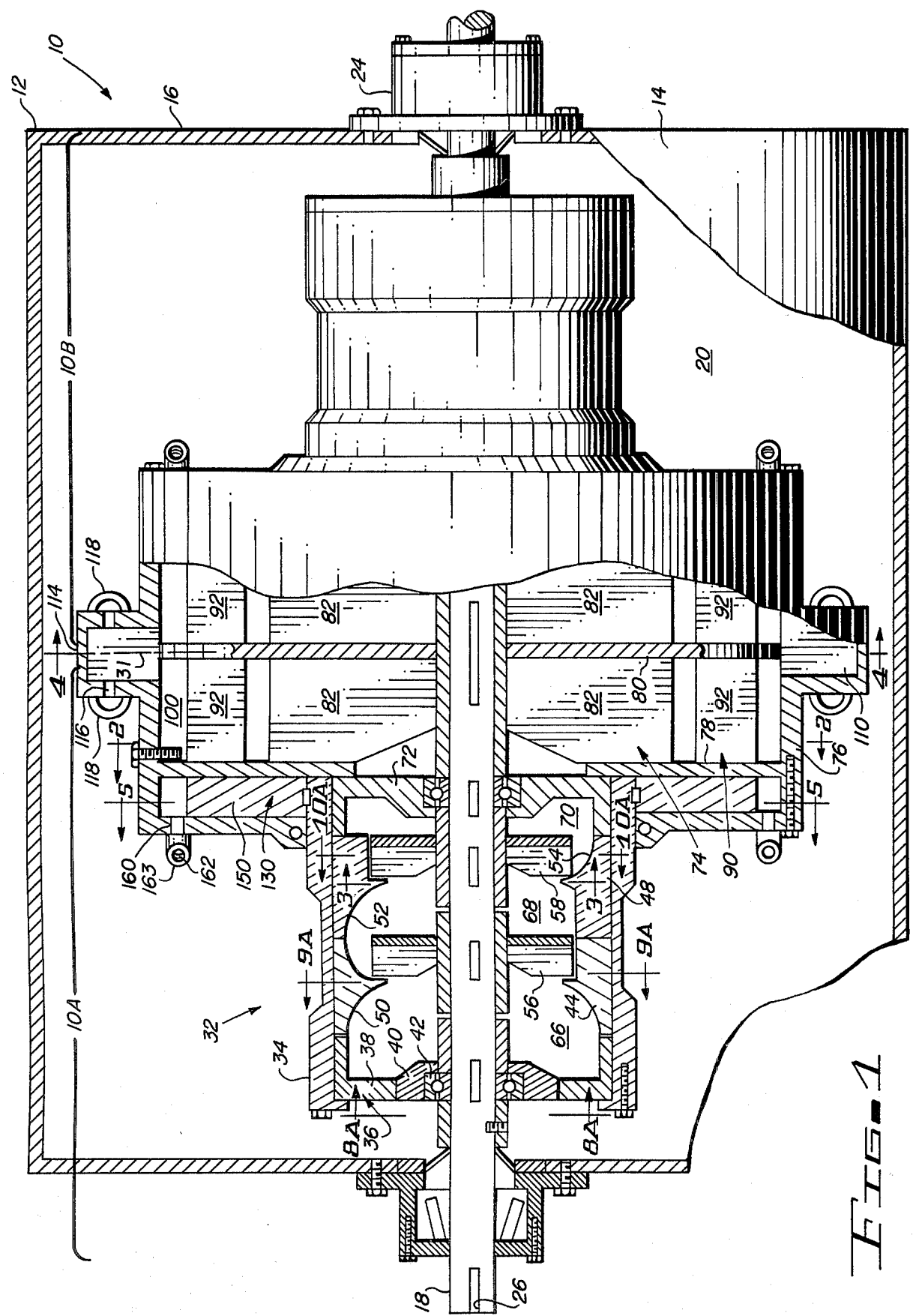
FIG. 1 is a longitudinal cross-section of the device of the present invention.

Turning now to the drawings, particularly FIGS. 1 and 11, the rotary device of the present invention is generally designated by the numeral 10 and includes a housing 12 which is shown as generally cylindrical having side walls 14 and circular end walls 16. Housing 12 defines an interior chamber 20 which serves as a reservoir for a fluid such as air or hydraulic fluid.

Axial shaft 18 extends concentrically through housing 12 and is mounted for rotation in bearings 22 and 24 secured to opposite end walls 16. Bearings 22 and 24 are preferably self-aligning, and are anti-friction heavy duty bearings shown of the flange mounting type. Key way 26 is provided in the left end of shaft 18 to facilitate mechanically connecting the shaft to a clutch or coupling 28 which, in turn, is in driven connection with prime mover 30. Similarly, the right end of shaft 18 may be connected to a device to perform useful work. The prime mover source may be any source of motive power such as a water wheel, wind driven turbine or other device such as an electric or hydraulic motor.

Figure 8A:
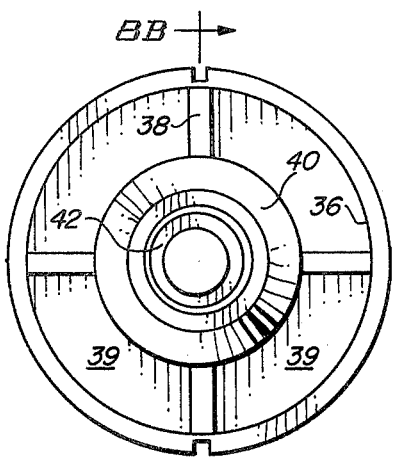
FIG. 8A is a sectional view taken along lines 8A—8A of FIG. 1.
Figure 8B:
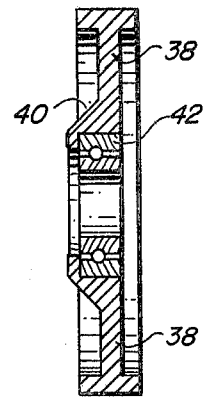
FIG. 8B is a sectional view taken along lines 8B—8B of FIG. 8A.
Figure 9A:
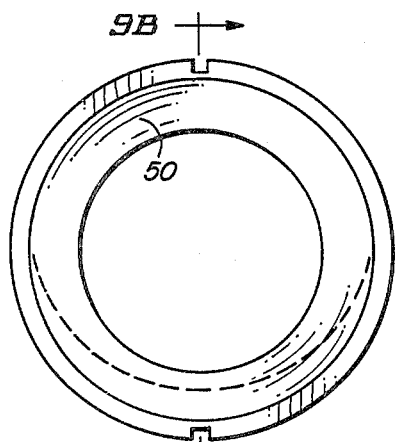
FIG. 9A is a sectional view taken along lines 9A—9A of FIG. 1.
Figure 9B:
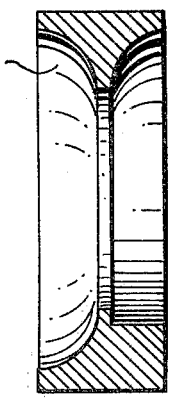
FIG. 9B is a sectional view taken along lines 9B—9B of FIG. 9A.
Figure 10A:
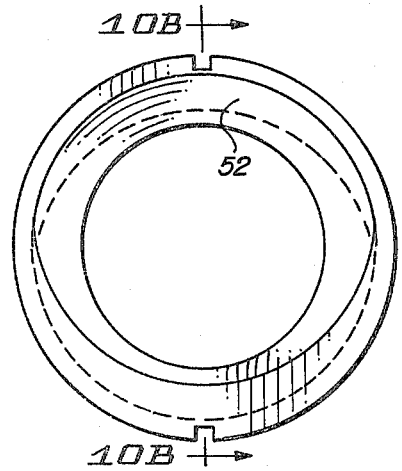
FIG. 10A is a sectional view taken along lines 10A—10A of FIG. 1.
Figure 10B:
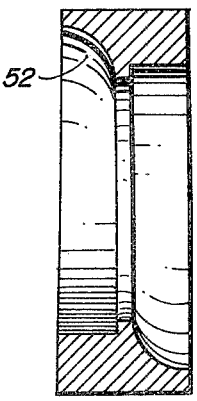
FIG. 10B is a sectional view taken along lines 10B—10B of FIG. 10A.

The apparatus 10 shown in the drawings comprises two primary sections 10A and 10B which are joined at center line 31. Sections 10A and 10B are mirror images of one another and therefore, description of section 10A will suffice, it being understood that this description applies equally to section 10B. Section 10A comprises a series of pump sections, the total number of section being limited as a practical matter only by the size of the housing. Initial section 32 as shown is two stage axial rotary device having an outer generally cylindrical housing section 34. A spider bearing bracket 36, as shown in FIGS. 8A and 8B, is positioned at the inlet to section 10A. Bracket 36 has a plurality of radially extending arms 38 extending from concentric bearing housing 40 which define inlet quadrants 39. Anti-friction bearings 42 are retained by housing 40 and support housing 10 for rotation about axially extending shaft 18.

Figure 3:
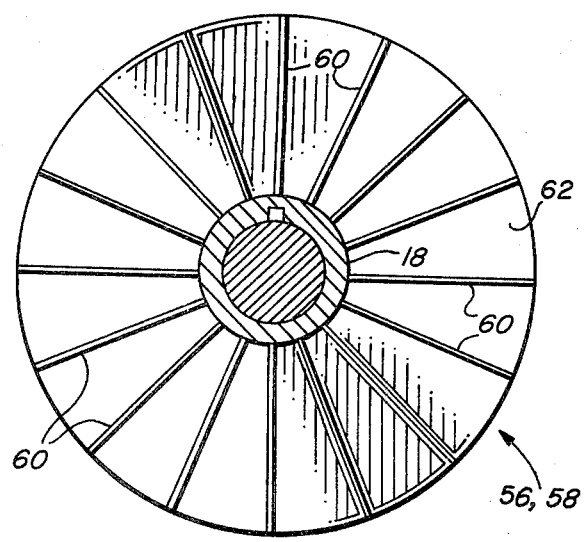
FIG. 3 is a sectional view taken along lines 3—3 of FIG. 1.

Housing 10 defines outer stator 44 and the inner stator member 48. Stator members 44 and 48 are preferably configured at sections 50, 52 and 54 having a concavity to direct flow to the rotor 56 and 58. Each of the rotors 56 and 58 are keyed or otherwise secured to axial shaft 18. As best seen in FIG. 3, each of the rotors 56 and 58 have a plurality of radially extending blades 60 which extend in a close proximity with stator sections 44 and 48 respectively. Blades 60 are shown as axially aligned on shaft 18 and having an annular backing plate 62. Blades 60 may also be propeller blades disposed angularly about the periphery of shaft 18.

Fluid drawn into initial axial pump chamber 32 across intake bracket 36 flows through rotor 56 and the velocity and pressure of the fluid is increased and fluid discharged into intermediate pump chamber 68. Fluid from chamber 68 is drawn across second stage rotor 58 and discharged into outlet chamber 70, the pressure velocity of the fluid being further increased through the second stage of axial pump section 32. Fluid from discharge chamber 70 exits axial stage 32 at discharge spider bracket 72. Spider bracket 72 is similar in construction to bracket 36 which has been described and shown in detail with reference to FIGS. 8A and 8B.

The pressurized fluid discharged from initial axial section 32 is directed to the second section 74.

Figure 2:
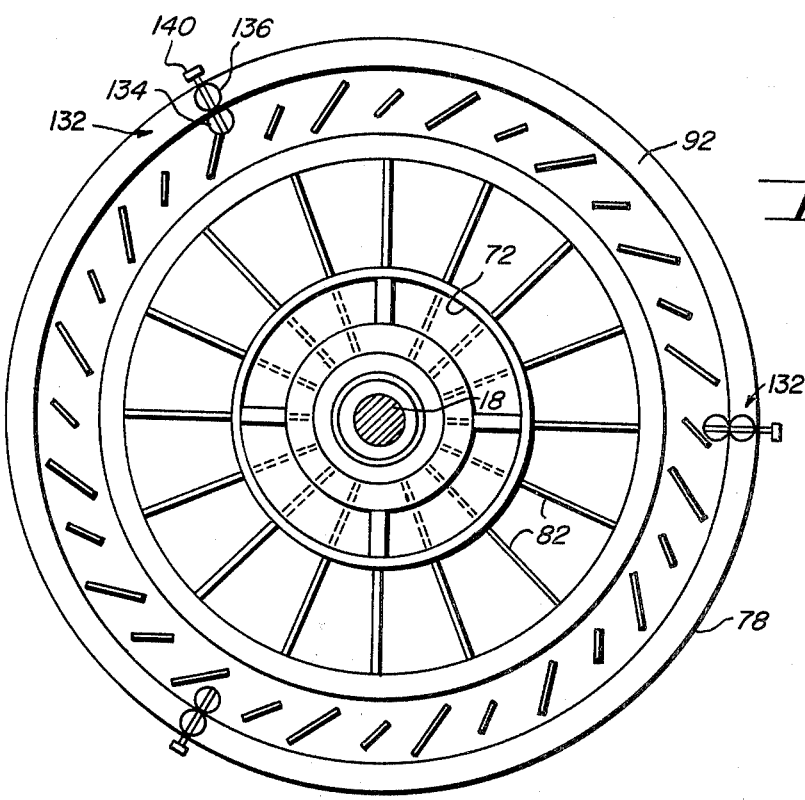
FIG. 2 is a sectional view taken along lines 2—2 of FIG. 1.
Figure 6:
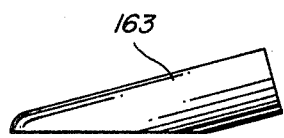
FIG. 6 is a detail view of the exhaust nozzle.
Figure 7:
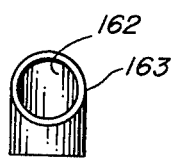
FIG. 7 is an end view of the exhaust nozzle shown in FIG. 6.

The second section 74 includes a radial blower as seen in FIG. 2 consisting of a housing having outer cylindrical wall 76 and side wall 78 which extends radially inward to a location engaging bearing bracket 72. Blower section 74 includes a circular plate 80 secured to shaft 18 and a plurality of radially extending blades 82 secured to shaft 18 and extending perpendicularly with respect to plate 82. Blades 82 are similarly secured to housing member 78.

A further pressure increase is experienced in the third stage which is a centrifugal device generally designated by the numeral 90 consisting of plurality of blades 92 extending between housing member 78 and plate 80. Blades 92 are non-radial and, as best seen in FIG. 2, operate as centrifugal pump or blower generally designated of the "squirrel cage" type. The vanes or blades 92 may be planar or may be arcuate and, as best seen in FIG. 2, may be of alternating lengths. Discharge from the third stage is received in annular plenum chamber 100 which is formed by plate 80, cylindrical housing member 76, wall 78 and the periphery of vanes or blades 92.

Figure 4:
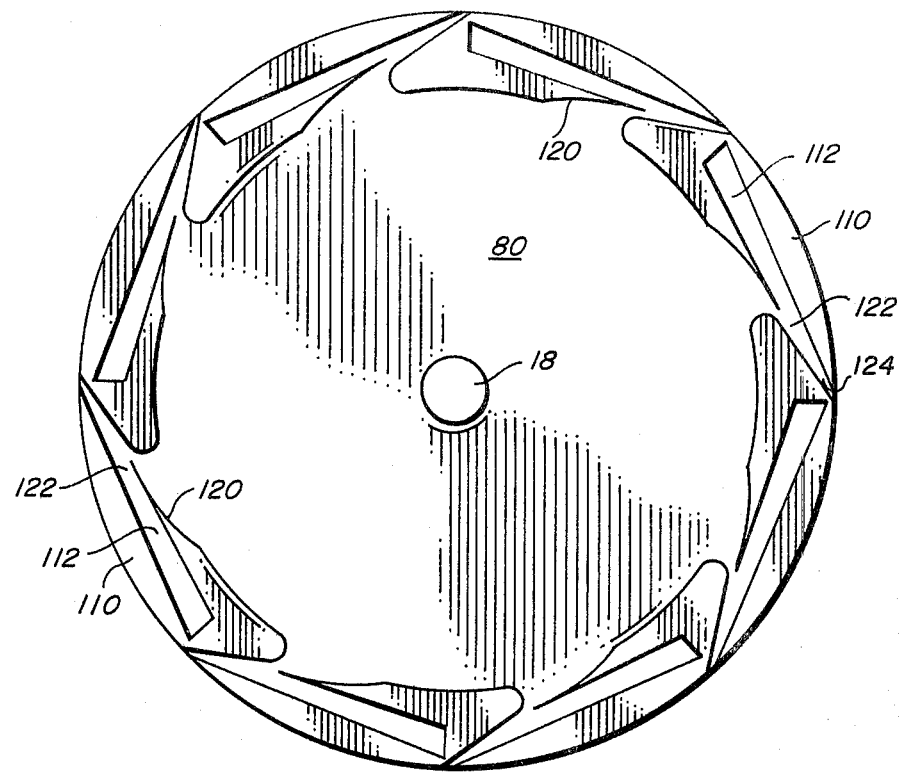
FIG. 4 is a sectional view taken along lines 4—4 of FIG. 1.

Peripherally secured to plate 80 is exhaust ring 110 as is best seen in FIG. 4. Exhaust ring is rotative with shaft 18 and defines a plurality of generally tangential discharge nozzles 112. A shroud 114 extends about the exhaust ring 110 and defines inlet port 116 which communicates with reservoir 20 at a location at the forward end of the nozzle 112. A plurality of cups 118 are positioned over the inlet ports 116 to assist in directing fluid into the nozzles 112. Passage 120 communicates annular plenum chamber 100 with nozzle 112 at a venturi section 122. A plurality of discharge openings 124 are provided in shroud 114 at the ends of nozzles 112. As the exhaust ring 110 rotates with shaft 18, pressurized fluid discharged into plenum 100 is drawn into venturi section 122 and discharged at outlet 124. In addition, fluid within reservoir 20 is trapped by cups 118 and, under the influence of the reduced pressure existing within venturi 122, drawn into nozzle 112 and discharged at 124.

A portion of the pressurized fluid within plenum 100 is directed to the fluid motor 130 which operates to rotate the housing 34 of initial axial pump section 32 in a direction opposite the rotation of shaft 18. Motive fluid from plenum 100 is directed to fluid motor 130 by regulating valves 132. Valves 132 are positioned peripherally about plenum chamber 100 in wall 78 and serve to direct hydraulic fluid to the fluid motor 130. Valves 132 are best seen in FIG. 2 and consist of a port 134 communicating plenum chamber 100 with hydraulic motor section 130 through wall 78. A valve member 136 is in threaded engagement with threaded valve stem 140. By rotating valve stem 140, member 136 can be positioned to relative to port 134 to establish the desired valve opening and flow rate to the motor 130.

Figure 5:
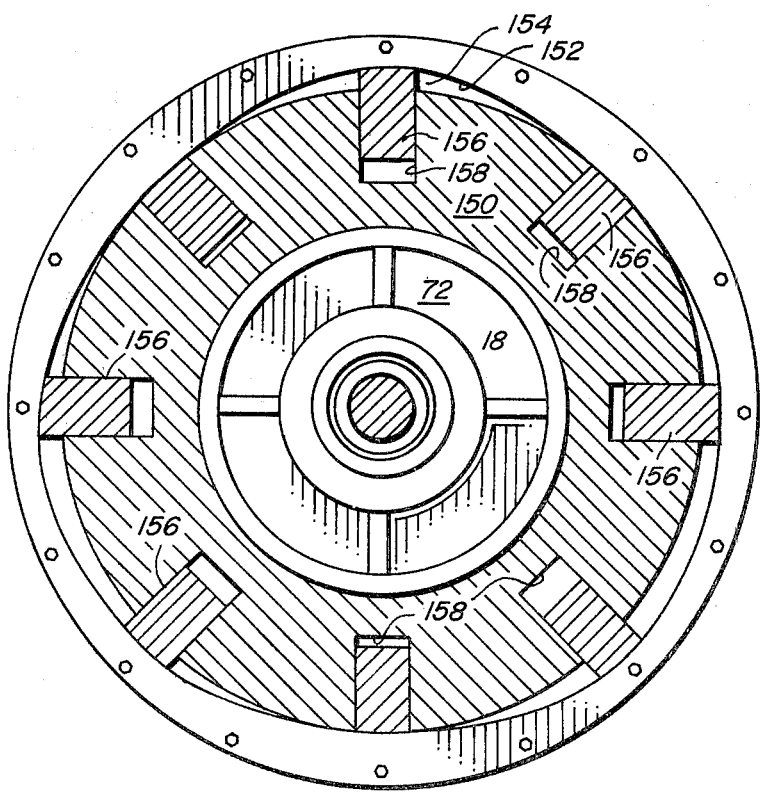
FIG. 5 is a sectional view taken along lines 5—5 of FIG. 1.

Hydraulic motor 130 is best shown in FIG. 5 and includes an annular rotor 150 which is affixed to housing 34. Rotor 150 is rotatable within a housing which has a non-circular inner wall 152 forming a plurality of pumping chamber 154 between the rotor periphery and the wall interior 152. Pumping chambers 154 are positioned oppositely adjacent valve 132. The pumping element further includes multiple blades or vanes 156 radially slidable within slots 158 arranged about the periphery of the rotor 150. Centrifugal forces which may be assisted by spring pressure exerted in slots 158, maintains the outer ends of blades 156 in contact with the casing bore 152. The blades are of an appropriate material such as hardened steel or bronze. Upper blade 156 is shown in the top dead center position in FIG. 5. As rotor 150 continues to rotate clockwise relative to wall 152, fluid ahead of blade 156 will be expelled through exhaust opening 160 to the surrounding reservoir 20. A nozzle conver 163 may be provided over exhaust opening 162 and serve to direct the discharge of fluid so as to cause casing to rotate in a rotational direction opposite that of the rotor 150.

From the foregoing, it will be observed that fluid pressure is increased in the various stages of the unit. The flywheel of the present invention can be operated using any fluid medium such as air or hydraulic fluid. The device of the present invention is also operable as a fluid or hydraulic motor or pump.

As pointed out above, I do not intend to limit my invention to the specific embodiment shown. For example, the number of stages in the initial axial pumping section can be varied in accordance with the dictates and requirements of size and horsepower. Similarly, multiple units, as shown, may be positioned in a balanced arrangement within a single enclosure on a single shaft. It will be obvious to those skilled in the art to make various modifications and alterations to the device disclosed herein. To the extent that these changes, alterations and modifications do not depart from the spirit and scope of the appended claims, they are intended to be encompassed therein.

I claim:
1. A rotary fluid device comprising:
   (a) a housing defining a chamber adapted to receive a working fluid;
   (b) an axially extending shaft having opposite ends and extending through said housing adapted to be connected to a prime mover at one end and adapted to be connected to perform work at the other end;
   (c) a first pressure stage having a stator and a rotor, said rotor being connected for rotation with said shaft, said first stage having an inlet for communicating fluid from said housing chamber and an outlet for discharging fluid pumped through said first pressure stage;
   (d) a second stage in fluid communication with the outlet from said first stage, said second stage including radially extending blades secured to said shaft and discharging the fluid radially into a peripheral plenum chamber;
   (e) exhaust means rotative with said shaft and including exhaust nozzle means having an inlet communicating with said plenum chamber and an outlet for discharging working fluid from said plenum chamber into said housing chamber;
   (f) fluid motor means including:
      (i) a casing rotative with said shaft;
      (ii) a second rotor rotative in said casing and secured to said stator; and
      (iii) valve means interposed between said motor and plenum for selectively admitting a second portion of the fluid from said plenum into said casing to rotate said second rotor and said stator in a rotative direction opposite the direction of rotation of said shaft and a discharge means in said casing for directing the fluid from the casing into the housing for rotating the casing in a rota- tive direction opposite the direction of rotation of said rotor.

2. The apparatus of claim 1 further including port means communicating said exhaust nozzle means with said housing chamber upstream of said nozzle discharge.

3. The apparatus of claim 2 further including cup means associated with said port means.

4. The apparatus of claim 1 wherein a third stage, including centrifugal blades is interposed between said second stage and said plenum chamber.

5. The apparatus of claim 1 wherein said first stage comprises at least one axial rotor.

* * * * *